US010072312B2

(12) United States Patent
Grant (10) Patent No.: US 10,072,312 B2
(45) Date of Patent: Sep. 11, 2018

(54) METHOD FOR OPERATING A TOP GAS RECYCLING BLAST FURNACE INSTALLATION

(71) Applicant: L'Air Liquide, Societe Anonyme pour l'Etude et l'Exploitation des Procedes Georges Claude, Paris (FR)

(72) Inventor: Michael Grant, Frankfurt am Main (DE)

(73) Assignee: L'Air Liquide Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 261 days.

(21) Appl. No.: 15/106,575

(22) PCT Filed: Nov. 27, 2014

(86) PCT No.: PCT/EP2014/075872
§ 371 (c)(1),
(2) Date: Jun. 20, 2016

(87) PCT Pub. No.: WO2015/090900
PCT Pub. Date: Jun. 25, 2015

(65) Prior Publication Data
US 2017/0002434 A1    Jan. 5, 2017

(30) Foreign Application Priority Data

Dec. 20, 2013   (EP) ..................................... 13306802

(51) Int. Cl.
*C21B 5/06*    (2006.01)
*C21B 7/00*    (2006.01)
(Continued)

(52) U.S. Cl.
CPC ................ *C21B 5/06* (2013.01); *C21B 5/001* (2013.01); *C21B 7/002* (2013.01); *C21B 9/14* (2013.01);
(Continued)

(58) Field of Classification Search
CPC .. C21B 5/06; C21B 7/002; C21B 9/14; C21B 2100/02; C21B 2100/04; C21B 2100/20;
(Continued)

(56) References Cited

U.S. PATENT DOCUMENTS

| 3,884,677 A | 5/1975 | Wenzel et al. |
| 2011/0209576 A1 | 9/2011 | Roth et al. |

(Continued)

FOREIGN PATENT DOCUMENTS

| CN | 101603104 A | * 12/2009 |
| CN | 102 876 824 | 1/2016 |
| EP | 2 584 052 | 4/2013 |

OTHER PUBLICATIONS

CN-101603104-A machine translation of the description. (published Dec. 2009).*

(Continued)

*Primary Examiner* — George P Wyszomierski
*Assistant Examiner* — Tima M McGuthry-Banks
(74) *Attorney, Agent, or Firm* — Christopher J. Cronin (57) ABSTRACT

Method of operating a blast furnace installation comprising a top gas recycle blast furnace and hot stones, whereby a hydrocarbon containing fuel is transformed into a transformed gas stream consisting mainly of CO and $H_2$ and substantially devoid of hydrocarbon, whereby a low-heating-value gaseous fuel is generated comprising a mixture of the transformed gas with a portion of the $CO_2$-rich tail gas obtained by decarbonatation of the blast furnace gas, and whereby the low-heating-value fuel is used to heat the hot (Continued)

furnace gas is heated before being injected into the blast-furnace.

16 Claims, 2 Drawing Sheets

(51) Int. Cl.
    *C21B 9/14*     (2006.01)
    *C21B 5/00*     (2006.01)

(52) U.S. Cl.
    CPC ...... *C21B 2100/02* (2013.01); *C21B 2100/04* (2013.01); *C21B 2100/22* (2017.05); *C21B 2100/26* (2017.05); *C21B 2100/282* (2017.05); *Y02P 10/122* (2015.11); *Y02P 10/126* (2015.11); *Y02P 10/132* (2015.11); *Y02P 10/283* (2015.11)

(58) Field of Classification Search
    CPC .......... C21B 2100/22; C21B 2100/282; C21B 2100/80; Y02P 10/124; Y02P 10/126
    USPC .................................................. 75/464, 468
    See application file for complete search history.

(56) References Cited

U.S. PATENT DOCUMENTS

| 2012/0064471 A1* | 3/2012 | Simoes | C21B 9/04 432/30 |
| 2012/0214115 A1* | 8/2012 | Cameron | C21B 9/00 432/30 |
| 2014/0252696 A1* | 9/2014 | Eschmann | C21B 5/06 266/44 |

OTHER PUBLICATIONS

International Search Report and Written Opinion for PCT/EP2014/075872, dated Mar. 2, 2015.

Sun, et al., "Variable Cycle Control Strategy for Blast Furnace Stoves Based on Blast Temperature Prediction," CCCM 2008, ISECS International Colloquium on CCCM, IEEE, Aug. 3, 2008, pp. 39-43.

* cited by examiner

METHOD FOR OPERATING A TOP GAS RECYCLING BLAST FURNACE INSTALLATION

CROSS-REFERENCE TO RELATED APPLICATIONS

This application is a § 371 of International PCT Application PCT/EP2014/075872, filed Nov. 27, 2014, which claims § 119(a) foreign priority to EP patent application EP13306802.3, filed Dec. 20, 2013.

BACKGROUND

Field of the Invention

The present invention relates to the production of iron in a top gas recycling blast furnace.

Related Art

The steel industry accounts for a significant percentage of the world's $CO_2$ emissions. Efforts are currently underway to greatly reduce these emissions and therefore the "carbon footprint" of the steel industry.

There are two paths to making steel:

1. by producing iron from iron ore in a blast furnace (BF) charged with iron ore and coke and into which combustible matter, such as coal, may also be injected as fuel and a reductant; whereafter the iron so produced is refined to steel in a basic oxygen furnace (BOF);

2. by melting scrap or direct reduced iron (DRI) in an electric arc furnace (EAF).

It is universally accepted that the blast furnace method produces significantly more $CO_2$ than the electric arc furnace method: $CO_2$ emissions of a BF/BOF route amount to approximately 1.3 times those of the EAF/DRI route and approximately to 4.3 those of the EAF/Scrap route.

In order to reduce the $CO_2$ emissions generated by iron production in a blast furnace, the top gas recycling blast furnace (TGRBF) was developed. The TGRBF uses substantially all of the blast furnace gas (BFG), after substantially all of the $CO_2$ has been removed therefrom, for reinjection into the blast furnace, thereby reducing coke consumption and $CO_2$ emissions. In TGRBFs, oxygen is used instead of the conventional (non-TGRBF) blast air or oxygen-enriched blast air.

The validity of the TGRBF concept has been demonstrated using a pilot scale blast furnace. It was demonstrated that approximately 25% of the $CO_2$ emissions could be avoided by recycling blast furnace top gas from which the $CO_2$ had been removed (decarbonated BFG). If $CO_2$ sequestration and storage (for example underground) could be achieved, then approximately 50% of the $CO_2$ emissions could be avoided.

In conventional, non-TGRBF, blast furnaces, energy efficiency is increased by heating the (optionally oxygen-enriched) blast air in hot stoves upstream of the BF.

Most frequently, BFG is the main fuel used to heat the stoves. The BFG is then often enriched with a small amount of coke oven gas (COG) or natural gas (NG) to increase the flame temperature sufficiently to achieve the required dome temperature in the stoves.

In the case of TGRBFs, energy efficiency can advantageously be increased by similarly heating the decarbonated BFG upstream of the BF.

EP-A-2584052 describes a particular method of operating a blast furnace installation comprising a TGRBF.

According to the known method, the top gas from the blast furnace is separated into a CO-enriched stream of process gas and a CO-depleted stream of process gas. According to the illustrated preferred embodiment of the method according to EP-A-2584052, fuel gas and oxidizing gas are fed to a burner and the hot flue gases thus created are used to heat regenerative heaters. The fuel gas is a mixture of the low-calorific tail gas and high-calorific gas such as coke oven gas. The oxidizing gas can be air or a mixture of flue gas from the regenerative heaters with pure oxygen.

After the heating phase, the CO-rich process gas is heated in the heated regenerative heaters and fed back into the blast furnace as reducing gas (blowing phase).

According to one embodiment of the known method, it is ensured that no oxidizing gas is present in the generative heaters at the beginning of the blowing phase by, during the changeover from the heating to the blowing phase, first stopping oxygen supply to the burner while the fuel gas mixture continuous to be fed to the burner so as to consume any residual oxygen present in the regenerative heaters. When all the oxidizing gas is gone from the regenerative heater, the supply of fuel gas mixture (and of flue gas) to the regenerative heater is interrupted and the blowing phase of the regenerative heater can begin safely.

However, as in the case of TGRBFs the goal is to minimize the consumption of coke and the associated $CO_2$ production by recycling as much decarbonated top gas as possible, little or no BFG normally remains for heating hot stoves for heating the recycled decarbonated BFG.

During the pilot scale TGRBF demonstration, the decarbonated BFG was heated in a pebble heater using a supplementary high-heating-value hydrocarbon gaseous fuel such as propane or natural gas.

SUMMARY OF THE INVENTION

It is an aim of the present invention to improve the energy efficiency of TGRBFs. It is more particularly an aim of the present invention to improve the energy efficiency of TGRBFs by heating the recycled decarbonated BFG using hot stoves. It is a further aim of the present invention to heat the recycled decarbonated BFG in hot stoves using a minimum of fuel other than the BFG generated by the TGRBF.

This invention relates to the production of iron in a TGRBF installation comprising stoves to heat the recycled top gas and a gas transforming reactor for producing a fuel gas beneficial for heating these stoves.

The present invention more specifically provides a method of operating a blast furnace installation comprising a TGRBF generating BFG, comprising the following steps:

a. decarbonating the generated BFG so as to obtain a $CO_2$-enriched rich tail gas stream and a decarbonated BFG stream containing not more than 3% vol $CO_2$, b. transforming a hydrocarbon-containing gaseous fuel not generated by the blast furnace to generate a transformed gas stream containing at least 70% vol of CO and $H_2$ in total (i.e. $C_{CO}+C_{H2}$), preferably at least 80% vol and more preferably at least 90% vol, and at most 7% vol of hydrocarbon, preferably at most 6% vol, c. producing a low-heating-value gaseous fuel having a heating value of from 2.8 to 7.0 $MJ/Nm^3$ and preferably from 5.5 to 6.0 $MJ/Nm^3$ and containing (i) a portion of the tail gas stream and (ii) at least a portion of the transformed gas stream and using the low heating value gaseous fuel for heating hot stoves, d. heating at least 70% vol of the decarbonated BFG stream in the hot stoves to a temperature between 700° C. and 1300° C., preferably between 850° C. and 1000° C. and more preferably between 880° C. and 920° C., to generate heated decarbonated BFG and e. injecting the heated decarbonated BFG into the blast furnace.

In such a TGRBF process, before decarbonation of the BFG leaving the top of the blast furnace, dust is preferably removed therefrom, leaving a so-called "clean" BFG. The TGRBF dedusting system may, in particular comprise a scrubber which removes fine dust particles through direct contact between water and the BFG and/or an electrostatic precipitator which also remove fine dust.

The BFG, or after dedusting, the clean BFG, enters a $CO_2$ removal system for decarbonation. The $CO_2$ removal system could be a VPSA, a PSA, a system using an adsorbent that physically separates $CO_2$ from the BFG or a system using a chemical absorbent such as amines to remove $CO_2$ from the BFG. Decarbonation of the (clean) BFG removes substantially all of $CO_2$ therefrom to leave a "product" gas or decarbonated BFG that consists mainly of CO and $H_2$ with minor amounts of $CO_2$ and $N_2$.

Within the limits of the TGRBF process, as much of this product gas as possible is heated to at least 700° C. and preferably to at least 900° C. before it is recycled back into the blast furnace, generally at the hearth tuyeres or possibly both at the hearth tuyeres and by stack tuyeres at stack level. The recycled CO and $H_2$ injected into the blast furnace replace carbon from coke normally used to produce reducing gases to reduce iron oxide ore to metallic iron.

The $CO_2$ that is removed from the BFG during decarbonation typically makes up approximately 80-90% of the tail gas leaving the gas decarbonation unit (with minor amounts of CO and $H_2$). This tail gas has substantially no heating value and can therefore be used as an inert gas or be treated further for storage underground.

In general BF stoves are designed to be heated by low-heating-value gas containing mainly CO and $H_2$ by way of combustible matter. Large volumes of hot combustion gas are therefore generated during the combustion of the low-heating-value gas for heating the stoves. The stove burner is normally of simple and robust design and is made of ceramic brick, with a central vertical line to introduce the low-heating-value gas and with surrounding horizontal air ports.

The low-heating-value gas is typically BFG, whereby the BFG may be enriched with COG (5.5-6.0 MJ/Nm3) to obtain a flame temperature adequate for achieving a sufficient dome temperature in the hot stove.

BF operations where COG is not available, or where the available COG is put to different use, have used BFG enriched with NG (instead of COG) to achieve the appropriate heating value. However, the presence of high concentrations of hydrocarbons in the "mixed gas" (BFG+NG) often results in strong vibrations in the stove burner and combustion chamber due to the combustion characteristics of gaseous hydrocarbons. These vibrations can seriously damage the stove equipment. It is believed that these vibrations are, at least in part, caused by the cracking of the hydrocarbons present in the fuel. Due to the lower hydrocarbon content of BFG+COG, this problem is less pronounced in the case of such mixtures.

BF stoves can therefore only reliably be heated using low-heating-value gases containing little or no hydrocarbons.

When stoves are used while insufficient BFG is available for heating the stoves, such as for example in the case of TGRBFs, in order to heat the stoves the BFG must be replaced by an alternative low-heating-value fuel containing little or no hydrocarbons.

In the case of TGRBFs, one could, for example, consider mixing the $CO_2$-enriched tail gas (heating value ~1.0 MJ/kg) with natural gas or COG to produce a low-heating-value gas with a heating value of 5.5-6.0 MJ/Nm$^3$ for the stoves. However, in that case the quantity of natural gas or COG required to enrich the tail gas would be so high as to create significant vibration problems when the mixture is burned in a conventional stove combustion chamber, so that this option cannot be retained.

This is illustrated in tables 1 to 4 below with respect to blast furnace installations equipped with stoves that require a gas heating value of 5.9 MJ/Nm$^3$.

Table 1 lists a typical composition and heating value of a BFG generated by a conventional (non-TGRBF) blast furnace and a typical composition and heating value of COG, as well as the composition of the mixture (mixed gas) of BFG and COG corresponding to the abovementioned heating value.

The final line of Table 1 indicates the volume of mixed gas that would be required to provide enough energy to enable the hot stove to heat a flow of recycled decarbonated BFG to 900° C. in the case of a TGRBF, as well as the corresponding volumes of BFG and COG contained in the mixed gas.

In the case of a mixed gas with a heating value of 5.9 MJ/Nm$^3$ and consisting of BFG and COG, the mixed gas would contain 5.5% hydrocarbons by volume.

TABLE 1

|  | Blast Furnace Gas | Coke Oven Gas | Mixed Gas |
|---|---|---|---|
| $H_2$ | 4.0 | 55.0 | 14.7 |
| $H_2O$ | 0.0 | 0.0 | 0.00 |
| $CO_2$ | 22.0 | 3.0 | 18.0 |
| CO | 22.0 | 6.0 | 18.6 |
| $N_2$ | 52.0 | 10.0 | 43.2 |
| Hydrocarbons | 0 | 26.0 | 5.5 |
| Heating Value (MJ/Nm$^3$) | 3.2 | 16.0 | 5.9 |
| Volume (Nm$^3$/thm) | 139.0 | 37.1 | 176.1 |

Table 2 describes the situation when the BFG is enriched with NG (instead of COG), all other factors being equal. In that case, the concentration of hydrocarbons in the mixed gas increases by 40%. Additionally, the concentration of hydrogen in the mixed gas decreases by 75%. Such a mixed gas not suitable for heating hot stoves due to the vibrations generated during its combustion.

TABLE 2

|  | Blast Furnace Gas | Natural Gas | Mixed Gas |
|---|---|---|---|
| $H_2$ | 4.0 | 0.0 | 3.7 |
| $H_2O$ | 0.0 | 0.0 | 0.0 |
| $CO_2$ | 22.0 | 0.2 | 20.2 |
| CO | 22.0 | 0.0 | 20.1 |
| $N_2$ | 52.0 | 0.6 | 47.8 |
| Hydrocarbons | 0 | 97.4 | 8.3 |
| Heating Value (MJ/Nm$^3$) | 3.2 | 34.9 | 5.9 |
| Volume (Nm$^3$/thm) | 161.1 | 15.0 | 176.1 |

In a TGRBF blast furnace, there is insufficient BFG for use in the stoves so an alternative low-heating value fuel would have to be found or created if hot stoves are to be used.

Tables 3 and 4 show the hypothetical case whereby low-calorific-value gas is generated using tail gas and respectively COG and natural gas, all other factors being as described with respect to table 1.

TABLE 3

|  | (V)PSA Tail Gas | Coke Oven Gas | Mixed Gas |
| --- | --- | --- | --- |
| $H_2$ | 0.4 | 55.0 | 16.0 |
| $H_2O$ | 0.0 | 0.0 | 0.00 |
| $CO_2$ | 84.7 | 3.0 | 61.3 |
| CO | 14.4 | 6.0 | 12.0 |
| $N_2$ | 0.5 | 10.0 | 3.2 |
| Hydrocarbons | 0 | 26.0 | 7.4 |
| Heating Value ($MJ/Nm^3$) | 3.2 | 16.0 | 5.9 |
| Volume ($Nm^3/thm$) | 125.8 | 50.4 | 176.1 |

TABLE 4

|  | (V)PSA Tail Gas | Natural Gas | Mixed Gas |
| --- | --- | --- | --- |
| $H_2$ | 0.4 | 0.0 | 0.3 |
| $H_2O$ | 0.0 | 0.0 | 0.0 |
| $CO_2$ | 84.7 | 0.5 | 74.4 |
| CO | 14.4 | 0.00 | 12.7 |
| $N_2$ | 0.5 | 2.1 | 0.7 |
| Hydrocarbons | 0 | 97.4 | 11.9 |
| Heating Value ($MJ/Nm^3$) | 3.2 | 34.9 | 5.9 |
| Volume ($Nm^3/thm$) | 154.5 | 21.6 | 176.1 |

One again observes significantly higher levels of hydrocarbons and significantly lower levels of $H_2$ in the mixed gases when compared to the mixed gas consisting of BOF and COG as illustrated in table 1, which again makes the mixed gases unsuitable for heating hot stoves.

The present invention thus clearly provides a much needed method to create supplementary low-heating value gaseous fuel suitable for use in heating blast furnace stoves when insufficient BFG is available, as is the case in TGRBFs.

The present invention provides a way to continue to use the existing (types of) stoves known from conventional BFs to heat the recycled decarbonated BFG of a TGRBF. This is achieved by designing a completely new system to heat the recycled decarbonated BFG.

According to one embodiment of the invention, the hydrocarbon-containing gaseous fuel contains natural gas and/or coke oven gas. Typically, the hydrocarbon-containing gaseous fuel consists of natural gas or coke oven gas or a mixture thereof.

One method of transforming the hydrocarbon-containing gaseous fuel is partial combustion thereof. A further method of transforming the hydrocarbon-containing fuel is the use of a fuel reforming process. These methods can also be used in combination.

It is, as such, known in the art to use of a reforming process to improve BFG.

U.S. Pat. No. 3,884,677 teaches the use of hydrocarbons, preferably oil, to "regenerate" blast furnace gas by reacting $CO_2$ in the BFG with the hydrocarbon such that very little $CO_2$ remains in the product gas that is recycled back into the blast furnace. The $CO_2$ removal process is accomplished through the conversion process and does not use a (V)PSA or chemical absorbent for reducing the $CO_2$ content of the recycle gas. The biggest disadvantage to this process is that approximately ½ of the blast furnace gas is required as fuel for carrying out the reactions. This leaves less BFG for recycling and therefore limits the amount of coke that can be replaced. However, even though approximately ½ of the BFG is "regenerated", the total gas that must be treated is substantial—in the order of 800-1000 $Nm^3$ BFG/thm. This necessitates a substantial capital investment to build a reactor that can treat enormous amounts of gas.

US Patent Application No. 2011/0209576 A1 teaches the use of solid hydrocarbons that are first flash devolatised to make a synthesis gas that is used to treat the recovered top gas through a reforming process. The purpose of this invention is to eliminate the need for a $CO_2$ removal system such as a (V)PSA or a chemical absorption unit by instead converting the $CO_2$ in the BFG to CO by reforming with synthesis gas created in the flash devolatisation unit. This invention will have the same problem as U.S. Pat. No. 3,884,677 in that a large amount of BFG will need to be converted requiring substantial capital investment even though it is stated in US Application No. 2011/0209576 A1 that the required capital investment need will be less than that for a (V)PSA.

In the context of the present invention, one possible method of reforming the hydrocarbon-containing fuel is steam reforming. A preferred method of reforming the hydrocarbon-containing fuel uses $CO_2$ as a reforming agent. This is known in the art as dry reforming. According to the invention, dry reforming (using $CO_2$) can be used in a known manner to reform the hydrocarbon-containing gaseous fuel such as COG, NG or any other hydrocarbon fuel not generated by the blast furnace. In that case, the reforming process preferably uses the tail gas, which is rich in $CO_2$ (typically 80-90% vol) to treat the hydrocarbon-containing fuel to create a gas rich in CO and $H_2$ that can be easily burned in stoves after the gas has been diluted with tail gas to bring down the heating value to one which is compatible with stove combustion. It is also possible, in accordance with the invention, to use both steam and $CO_2$, preferably in the form of tail gas, as reforming agents for producing the transformed gas stream.

The low-heating-value gaseous fuel may consist of a mixture of all or at least a portion of the transformed gas stream and a portion of the tail gas stream, whereby the tail gas dilutes the transformed gas, thereby lowering the heating value to the level required for the safe operation of the hot stoves.

According to a preferred embodiment, at least a portion of the transformed gas stream is mixed with the decarbonated BFG so as to obtain a fortified decarbonated BFG stream upstream of the hot stoves. Fortifying the decarbonated BFG improves the blast furnace process by increasing the hydrogen content of the product gas to provide a smooth reduction process as hydrogen is known to help stabilize a blast furnace.

In that case, the low-heating-value gaseous fuel may contain or consist of a first portion of the fortified decarbonated BFG stream. When partial combustion of the hydrocarbon-containing gaseous fuel in a partial combustion reactor is used to generate the transformed gas stream, a second portion of the fortified decarbonated BFG stream may be used to heat the partial combustion reactor, in which case the second portion is preferably burned with air. When a fuel reforming process is conducted in a reformer to generate the transformed gas stream, a third portion of the fortified decarbonated BFG stream may be used to heat the reformer, for example by combusting the third portion with air. In the present context, the reference to a first, second and third portion of the fortified decarbonated BFG stream merely serves to distinguish between the different uses made of the portions. A reference to the "second portion" does not necessarily require that a "first portion" is also used in the process, nor does a reference to the "third portion" necessarily require that a "first portion" and/or a "second portion" is also used. It is, however, perfectly possible, in accordance with the invention, to use any combination of the "first portion", "second portion" and "third portion".

The invention thus makes it possible to use the tail gas taken from the blast furnace gas, for example produced by a (V)PSA and consisting for 85 to 90% vol of $CO_2$, to reform hydrocarbon-containing gaseous fuel, such as coke oven gas and/or natural gas, for fortifying the recycled decarbonated BFG prior to its injection into the blast furnace. This embodiment of the invention provides enough extra decarbonated BFG to provide a high heating value gas (containing hardly any or substantially no hydrocarbons) that can then be remixed with remaining tail gas making a low heating value fuel for heating the stoves. At the same time, the proportion of hydrogen in the recycled decarbonated BFG is increased enabling further reduction of coke consumption, thus also reducing the overall emissions of $CO_2$.

Advantageously, less than 100% vol of the decarbonated BFG stream is recycled and injected into the blast furnace. Preferably, from 80 to 90% vol of the decarbonated BFG stream is heated in the hot stoves and injected into the blast furnace.

The success of the TGRBF depends on the ability to recycle as much of the decarbonated BFG as possible. However, BFG recycle can create new problems in the blast furnace process, such as nitrogen accumulation. Nitrogen has many uses in the blast furnace, such as (i) to convey pulverized coal to the tuyeres, (ii) instrumentation purges, (iii) pressurization of the materials charging lock hoppers, etc, and, as illustrated in tables 1 to 4, the BFG contains some nitrogen, even in the case of TGRBFs which are operated with oxygen instead of air or oxygen enriched air as is the case for conventional BFs. Most of the nitrogen in the BFG passes out of the top of the furnace, through the gas cleaning system (if present) and through the $CO_2$ removal system so that it is recycled back to the blast furnace with the decarbonated BFG. Due to the decarbonated BFG recycle, nitrogen accumulates in the TGRBF gas circuit thus diluting the reducing gases and potentially resulting in loss of productivity or requiring increases in blast furnace fuel rate to maintain productivity. Purging part of the decarbonated BFG, i.e. not recycling the part of the decarbonated BFG to the blast furnace makes it possible to avoid such an accumulation of nitrogen in the BFG.

It is a specific advantage of the present invention, and in particular of the embodiment whereby all or at least a portion of the transformed gas stream is mixed with the decarbonated BFG so as to fortify the decarbonated BFG, that the process of the invention provides enough top gas and therefore also decarbonated BFG to both recycle decarbonated BFG into the blast furnace and to heat the stoves.

The heated decarbonated BFG may be injected into the blast furnace via hearth tuyeres, and optionally also via shaft tuyeres.

As mentioned above, a VPSA, a PSA or a chemical absorption unit may be used to decarbonate the BFG.

For heating the hot stoves, the low-heating-value gaseous fuel may be burned with any suitable combustion oxidant, typically with air.

The current invention takes advantage of using available $CO_2$ removal technologies. A relatively small amount of gas is transformed, namely the hydrocarbon-containing gaseous fuel, in order to produce a CO and $H_2$ rich gas that can be either used directly in the stoves after dilution with additional tail gas and/or that can be mixed with the decarbonated BFG coming from the $CO_2$ removal unit to enrich the recycle gas with $H_2$ and thereby to increase the ease of reduction in the blast furnace.

When CO and $H_2$ rich gas is mixed with the decarbonated BFG coming from the $CO_2$ removal unit a richer decarbonated BFG is created with higher heating value from which part can be used to heat the stoves after dilution with some of the remaining tail gas. The remaining recycle decarbonated BFG which is injected in the blast furnace suffices to achieve at least the same coke rate reduction as a TGRBF that simply recycles all of its decarbonated BFG. The purpose is to provide enough $CO+H_2$ rich gas to heat the stoves while maintaining the original large coke rate reduction that is anticipated by substantially recycling all product gas.

The present invention and its advantages will be better understood in the light of the following examples described with reference to FIGS. 1 and 2 which are schematic representations of two embodiments of the process according to the invention.

DETAILED DESCRIPTION OF THE INVENTION

Figure 1:
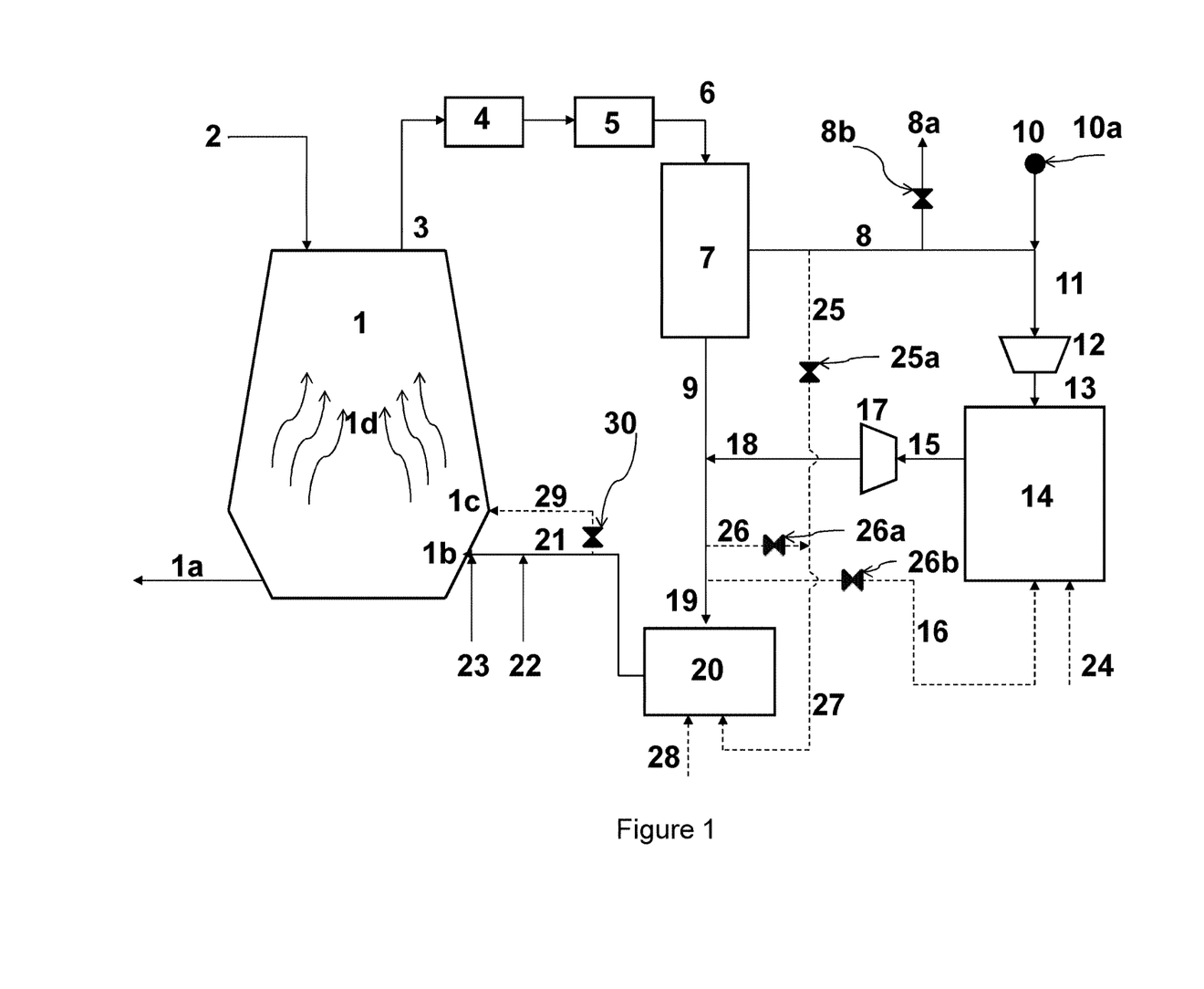
FIG. 1 is a schematic of a first embodiment of the invention.

FIG. 1 describes a preferred embodiment of the invention. A blast furnace 1 is charged from the top with coke and iron ore 2 which descend in the blast furnace 1. Substantially pure oxygen 22, pulverized coal (or another organic combustible substance) 23 along with recycled decarbonated blast furnace gas (a.k.a. product gas) 21 are injected in the hearth tuyeres 1b. Optionally a portion of recycled product gas 29 is injected into the shaft tuyere 1c to combine inside the blast furnace with the gases produced at the hearth tuyeres to produce a reducing gas 1d that ascends the inside of blast furnace 1, contacts the iron ore and coke 2 and reduces the iron oxides contained in the ore to metallic iron. This metallic iron continues its descent to the bottom of the blast furnace 1 where it is removed (tapped) 1a along with a slag containing oxide impurities. The blast furnace gas (BFG) 3 exits the blast furnace 1 and travels to an initial dust removal unit 4 where large particles of dust are removed. It continues to a second dust removal system 5 that removes the fine dust particles to produce a "clean gas" 6. The clean gas 6 is optionally dewatered before entering the $CO_2$ removal system 7. The $CO_2$ removal system 7 can be a vacuum pressure swing adsorption system (VPSA), a pressure swing adsorption system (PSA) or a chemical absorption system such as an amines-based absorption system or any other type of system that removes $CO_2$ from the (clean) BFG. Substantially all of the $CO_2$ is removed at 7 with the exception of that which is not practical to remove (<10% vol).

The clean gas stream 6 is split into two streams during $CO_2$ separation: a $CO_2$-enriched tail gas 8 and a $CO_2$-lean product gas or decarbonated BFG 9. The $CO_2$ rich tail gas 8 is mixed with supplementary fuel gas 10 and if required, steam 10a to provide a gas composition 11 that can be reformed or partially combusted to create the desired CO+H$_2$ containing mixture (low in hydrocarbons) suitable (a) for use in the low-heating-value fuel for heating the stoves and (b) for mixing with the decarbonated BFG 9 for recycling into the blast furnace (see below). The quantity of CO$_2$ rich tail gas that is used in the reforming or partial combustion process will depend on the process used, the process for treating the mixture (reforming and/or partial oxidation) and the pressure in reactor 14. The quantity of tail gas 8 used in reactor 14, and in the low-heating value fuel (see below) will be regulated using valves 8b and 25a, which also determine the quantity of tail gas 8a leaving the system (purge).

The CO$_2$-lean product gas stream (decarbonated BFG) 9 exits the CO$_2$ removal system 7 at elevated pressure (typically 4-8 Bar) and is fortified with synthetic gas (transformed gas) created from the reformation and/or partial oxidation of NG or COG 18, the synthetic or transformed gas consisting mainly of CO and H$_2$ coming from the reactor 14. COG or NG 10 plus (optionally) steam 10a and CO$_2$ rich tail gas 8 will normally need to be pressurized to improve the kinetics of the reforming and/or partial oxidation process taking place in 14. The pressurization of these gases will be done at compressor 12 to make a pressurized mixture of gases 13 that are reformed and/or partially combusted in reactor 14. After conversion of gases 13 to a mixture rich in CO and H$_2$ (stream 15), the gases 15 may need to be depressurized to an appropriate pressure for injection in the blast furnace. This would be accomplished using gas expander 17. Depending on the pressure drop between the entrance and exit of the expander, energy from the expander 17 could be used to generate electricity.

Fortified gas stream 19 is created from mixing stream 9 with stream 18. A portion 26 of stream 19 is diverted for making a "mixed gas" 27 that will be used as a low-heating-value fuel for heating the stoves. This portion 26 of stream 19 used in the mixed gas 27 is regulated using valve 26a. Mixed gas 27 has a heating value appropriate for heating stoves 20. Mixed gas 27 is created using a portion 25 of CO$_2$-rich tail gas whose flow rate will be regulated by valve 25a to be mixed with a portion 26 of stream 19. The heating value of mixed gas 27 is typically low (5.5-6.0 MJ/Nm$^3$) and the mixed gas has (a) a low content of hydrocarbons to prevent vibration in the stove combustion chamber and (b) a high content of CO and H$_2$ for facilitating smooth combustion. Another portion of stream 19 (stream 16) is used as fuel to heat reactor 14. The flow rate of stream 16 will be regulated using valve 26b. Air stream 28 is used as an oxidant to combust stream 27 for heating the stoves and air stream 24 is used as an oxidant to combust stream 16 for heating reactor 14.

Fortified gas stream 19 is heated in stoves 20 to create gas streams 21 and 29 having a temperature greater than 700° C. and as high as 1300° C. However, the preferred temperature of stream 21 is between 850° C. and 1000° C. and more preferably 880°-920° C. in order to prevent possible reduction of the oxide refractory lining the pipeline to the blast furnace. Gas stream 29 may or may not be used depending on the configuration of the particular TGRBF. The distribution of flow rates between streams 21 and 29 are governed by valve 30.

Figure 2:
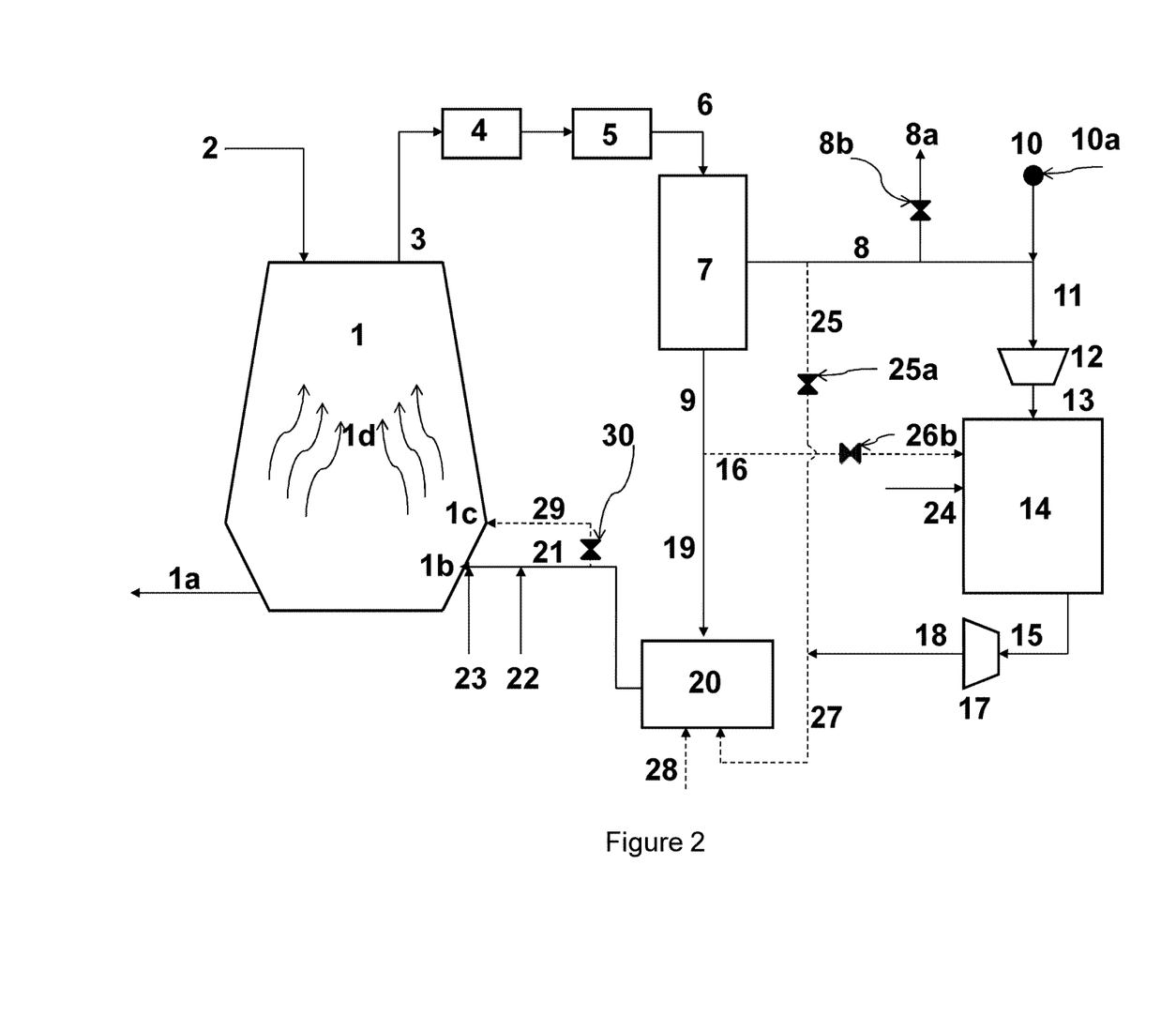
FIG. 2 is a schematic of a second embodiment of the invention.

FIG. 2 describes a second embodiment where a blast furnace 1 is charged from the top with coke and iron ore 2 which descend in the blast furnace. Substantially pure oxygen 22, pulverized coal (or another organic combustible) 23 along with recycled decarbonated blast furnace gas (product gas) 21 are injected in the hearth tuyeres 1b. Optionally a portion of recycled product gas 29 is injected into the shaft tuyere 1c to combine inside the blast furnace with the gases produced at the hearth tuyeres to produce a reducing gas 1d that ascends the inside blast furnace 1, contacts the iron ore and coke 2 and reduces the iron oxides contained in the ore to metallic iron. This metallic iron continues its descent to the bottom of the blast furnace where it is removed (tapped) 1a along with a slag containing oxide impurities. The blast furnace gas (BFG) 3 exits the blast furnace 1 and travels to an initial dust removal unit 4 where large particles of dust are removed. It continues to a second dust removal system 5 that removes the fine dust particles to produce a "clean gas" 6. The clean gas 6 is optionally dewatered before entering the CO$_2$ removal system 7. The CO$_2$ removal system 7 can be a vacuum pressure swing adsorption system (VSPA), a pressure swing adsorption system (PSA), and a chemical absorption system such as amines or any other type of system that removes CO$_2$ from the "clean gas". Substantially all of the CO$_2$ is removed at 7 with the exception of that which is not practical to remove (<10%).

The clean gas stream 6 is split into two streams during CO$_2$ separation: a CO$_2$-rich tail gas 8 and a CO$_2$-lean product gas (decarbonated BFG) 9. The CO$_2$-rich tail gas 8 is mixed with supplementary fuel 10 and, if required, steam 10a to provide a gas composition 11 that can be reformed or partially combusted to create the desired CO+H$_2$ mixture (low in hydrocarbons) for use in the low-heating-value fuel for heating the stoves. The quantity of CO$_2$ rich tail gas that is used in the reforming or partial combustion process depends on the process used, the process for treating the mixture (reforming or partial oxidation) and the pressure in reactor 14. The quantity of tail gas 8 used thereto is regulated using valves 8b and 25a which also determines the quantity of tail gas 8a leaving the system.

The CO$_2$-lean product gas stream 9 exits the CO$_2$ removal system 7 at elevated pressure (typically 4-8 Bar) and is split into a portion 19 that is recycled in the blast furnace and another portion 16 that is used to heat reactor 14. COG or NG 10 plus steam 10a and CO$_2$-rich tail gas 8 normally need to be pressurized to improve the kinetics of the reforming or partial oxidation process taking place in reactor 14. The pressurization of these gases is done at compressor 12 to make a pressurized mixture of gases 13 that is reformed and/or partially combusted in reactor 14. After conversion of gases 13 to a mixture rich in CO and H$_2$ (stream 15), the gas stream 15 may need to be depressurized to an appropriate pressure for injection in the blast furnace. This is accomplished using gas expander 17. Depending on the pressure drop between the entrance and exit of the expander 17, energy from the expander could be used to generate electricity. After CO and H$_2$ rich stream 15 is expanded at 17 to become stream 18 which is now suitably rich in CO and H$_2$ and sufficiently lean in hydrocarbons, it mixes with CO$_2$-rich stream 25 in order to have a low enough heating value (5.5-6.0 MJ/Nm$^3$) (stream 27) to be used in the stoves. Air stream 28 is used as an oxidant to combust stream 27 for heating the stoves and air stream 24 is used as an oxidant to combust stream 16 for heating reactor 14.

Product gas stream 19 will be heated in stoves 20 to create gas streams 21 and 29 having a temperature greater than 700° C. and as high as 1300° C. However, the preferred temperature of stream 21 is between 850° C. and 1000° C. and more preferably 880°-920° C. in order to prevent possible reduction of the oxide refractory lining the pipeline to the blast furnace. Gas stream 29 may or not be used depending on the configuration of the particular TGRBF. The distribution of flow rates between streams 21 and 29 are governed by valve 30.

Table 5 illustrates the differences between, on the one hand, a prior-art TGRBF as demonstrated at pilot scale in Europe and, on the other hand, a TGRBF according to the preferred embodiment of the invention as illustrated in FIG. 1, both when reformed natural gas and when reformed COG is used to fortify the recycled top gas.

This example was calculated from actual blast furnace data using a blast furnace model which was initially used to calculate the performance of a TGRBF, taking into consideration the reduction efficiency and heat losses.

The model simulated a TGRBF that injects 50% of the heated (900° C.) recycled gas through the hearth tuyeres and 50% through the shaft tuyeres.

The operation of a TGRBF was then modeled to include the preferred embodiment with identical gas utilization at FeO level, identical total heat losses and identical percentages of the heat loss in the lower blast furnace, so as to illustrate the advantages of the invention for operating the stoves.

Due to the hydrogen content of COG, the biggest reduction in coke rate is predicted for a TGRBF that is using maximum limits of both RAFT (2300°) and top gas temperature (200° C.). The predictions calculated for a TGRBF using the preferred embodiment show blast furnace operations that are more comfortable with RAFT well below the commonly agreed upon maximum. Less oxygen is needed to supply a TGRBF using the preferred embodiment of the invention.

Table 5 also illustrates how the extra gas reformed from COG or NG and used to fortify the decarbonated blast furnace gas enabled the total recycle ratio (last row Table 5) to drop to 80.0-81.5%. This provided enough left over gas to:

Heat the stoves,

Heat the reformer;

Improve the thermodynamics of reduction,

This compares to the reference TGRBF where it would be necessary to recycle more than 90% to achieve a higher coke rate reduction. The recycled feed gas left over (~10%) was not enough to heat the stoves and in this case it would have been necessary to use fuel (COG or NG) to heat the stoves.

TABLE 5

Example Blast Furnace improvement using the Preferred Embodiment.

|  |  | Reference TGRBF | Preferred Embodiment using Reformed NG | Preferred Embodiment using Reformed COG |
|---|---|---|---|---|
| Reductant Consumption |  |  |  |  |
| Coke rate calculated | Kg/thm | 273 | 252 | 248 |
| Coal Injection Rate | Kg/thm | 150 | 150 | 150 |
| Tuyeres |  |  |  |  |
| Oxygen Volume Calculated | Nm3/thm | 262 | 250 | 248 |
| Raceway Gas Volume (Bosh Gas Volume) | Nm3/thm | 1005 | 1009 | 1019 |
| RAFT (Raceway Adiabatic Flame Temp.) | ° C. | 2295 | 2205 | 2200 |
| Top Gas |  |  |  |  |
| Volume (dry) | Nm3/thm | 1426 | 1403 | 1410 |
| Temperature | ° C. | 199 | 189 | 188 |
| CO | % | 57.3 | 53.6 | 50.1 |
| CO2 | % | 33.5 | 32.4 | 31.1 |
| H2 | % | 6.6 | 12.3 | 14.5 |
| N2 | % | 2.7 | 1.7 | 4.3 |
| CO2/(CO + CO2) |  | 0.369 | 0.376 | 0.383 |
| BF Operational Results |  |  |  |  |
| Global Direct Reduction Rate | % | 10.2% | 7.8% | 7.5% |
| Direct Reduction Degree of Iron Oxides | % | 8.5% | 6.0% | 5.7% |
| Type of Operation |  |  |  |  |
| Total Gas Recycled into the BF | Nm3/thm | 816 | 869 | 897 |
| Recycle Gas Temperature (° C.) | ° C. | 900 | 900 | 900 |
| Percent Decarbonated Top Gas Recycled to Blast Furnace | % | 91.9 | 80.3 | 81.5 | reformed COG as taught in the preferred embodiment of the invention. A coke rate reduction of 25 kg/thm is expected using the invention with COG. Significant coke rate reduction can be achieved also when using reformed natural gas where a 21 kg/thm coke rate reduction can be anticipated using the invention.

In all three cases shown in Table 5, the raceway adiabatic flame temperature (RAFT), and top temperature are within the limits generally accepted by blast furnace operators. However, the reference TGRBF in Table 5 is operating at its While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within the range.

All references identified herein are each hereby incorporated by reference into this application in their entireties, as well as for the specific information for which each is cited.

What is claimed is:

1. A method of operating a blast furnace installation comprising a top gas recycle blast furnace generating blast furnace gas, comprising the steps of:
   decarbonating the blast furnace gas so as to obtain a $CO_2$-enriched rich tail gas stream and a decarbonated blast furnace gas stream containing not more than 3% vol $CO_2$;
   transforming a hydrocarbon-containing gaseous fuel not generated by the blast furnace to generate a transformed gas stream containing at least 70% vol of CO and $H_2$ in total and at most 7% vol of hydrocarbon;
   producing a low-heating-value gaseous fuel having a heating value of from 2.8 to 7.0 MJ/Nm$^3$ and containing (i) a portion of the tail gas stream and (ii) at least a first portion of the transformed gas stream and using said low-heating-value gaseous fuel for heating hot stoves;
   heating at least 70% vol of the decarbonated blast furnace gas stream in the hot stoves to a temperature between 700° C. and 1300° C. to generate heated decarbonated blast furnace gas; and
   injecting the heated decarbonated blast furnace gas into the blast furnace.

2. The method of claim 1, wherein the hydrocarbon-containing gaseous fuel contains natural gas and/or coke oven gas.

3. The method of claim 1, wherein partial combustion of the hydrocarbon-containing gaseous fuel is used to generate the transformed gas stream.

4. The method of claim 1, wherein a fuel reforming process is used to generate the transformed gas stream.

5. The method of claim 4, wherein the hydrocarbon-containing fuel is reformed using $CO_2$ as a reforming agent.

6. The method of claim 5, wherein a part of the tail gas is used as a reforming agent.

7. The method of claim 1, wherein at least a portion of the transformed gas stream is mixed with the decarbonated blast furnace gas so as to obtain a fortified decarbonated blast furnace gas stream upstream of the hot stoves.

8. The method of claim 7, wherein the low-heating-value gaseous fuel contains a first portion of the fortified decarbonated blast furnace gas stream.

9. The method of claim 7, wherein partial combustion of the hydrocarbon-containing gaseous fuel in a partial combustion reactor is used to generate the transformed gas stream and a second portion of the fortified decarbonated blast furnace gas stream is used to heat the partial combustion reactor.

10. The method of claim 7, wherein a fuel reforming process is conducted in a reformer to generate the transformed gas stream and whereby a third portion of the fortified decarbonated blast furnace gas stream is used to heat the reformer.

11. The method of claim 10, wherein combustion of said third portion with air is used to heat the reformer.

12. The method of claim 1, whereby 80 to 90% vol of the decarbonated blast furnace gas stream is heated in the hot stoves and injected into the blast furnace.

13. The method of claim 1, whereby the heated decarbonated blast furnace gas is injected into the blast furnace via hearth tuyeres.

14. The method of claim 13, wherein the heated decarbonated blast furnace gas is injected into the blast furnace also via shaft tuyeres.

15. The method of claim 1, whereby a vacuum pressure swing adsorption, a pressure swing adsorption or a chemical absorption unit is used to decarbonate the blast furnace gas.

16. The method of claim 1 whereby the hot stoves are heated by burning the low-heating-value gaseous fuel with air.

* * * * *